Nov. 21, 1972  G. J. BELLASALMA  3,703,572
METHOD OF FORMING A MOLD AND CASTING SHALLOW ARTICLES THEREIN
Filed Nov. 14, 1969  2 Sheets-Sheet 1
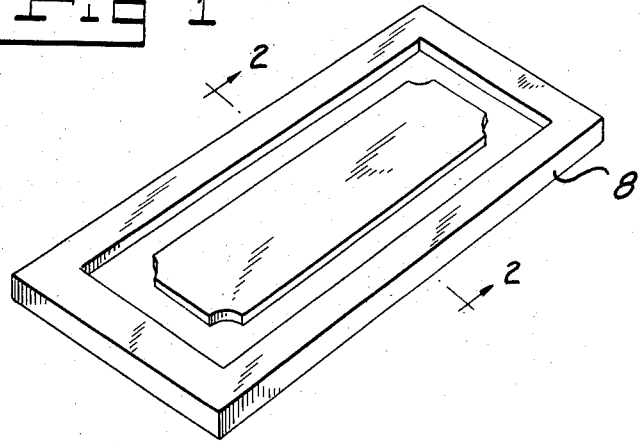
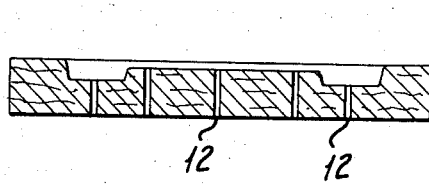
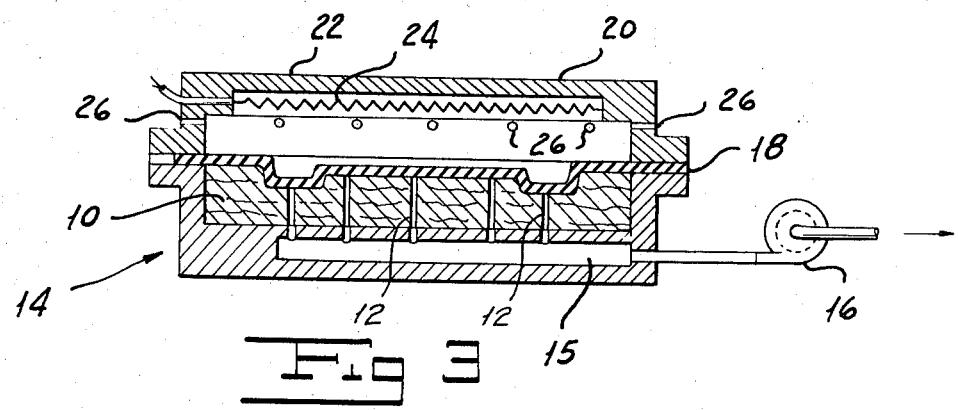
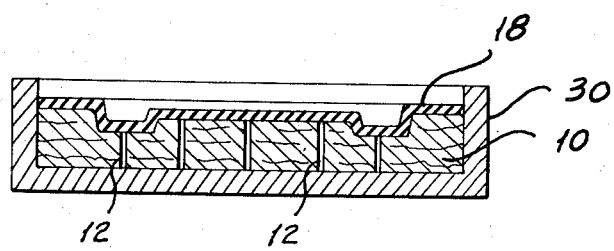
INVENTOR.
Gerald J. Bellasalma
BY Kenier + O'Connor
ATTORNEYS

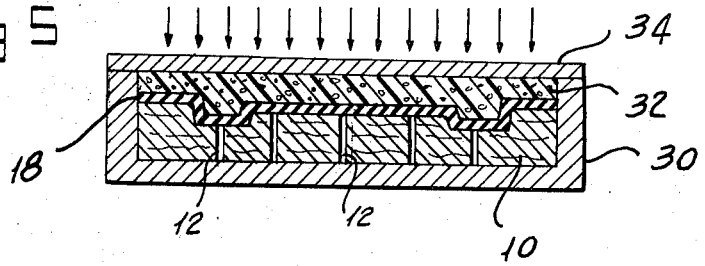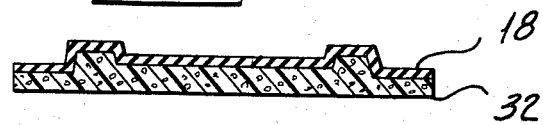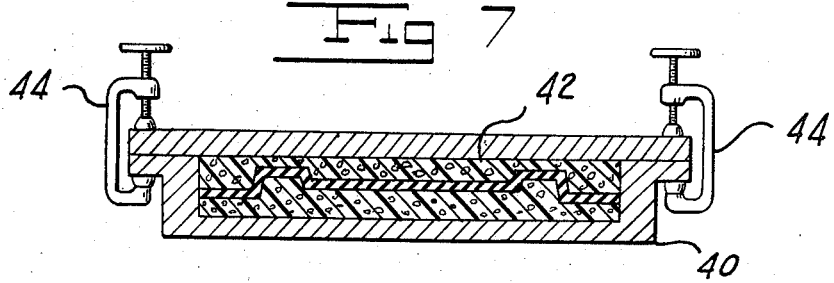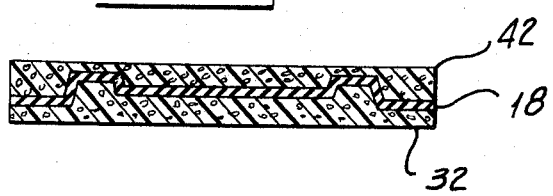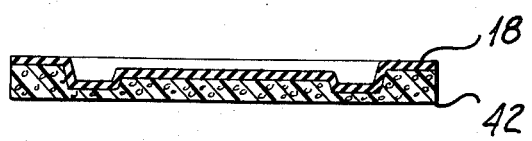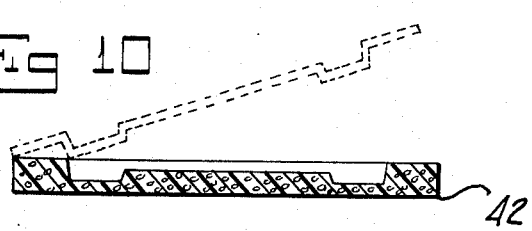

United States Patent Office 3,703,572
Patented Nov. 21, 1972

3,703,572
METHOD OF FORMING A MOLD AND CASTING SHALLOW ARTICLES THEREIN
Gerald J. Bellasalma, West Caldwell, N.J., assignor to Plastetics, Inc., Fairfield, N.J.
Filed Nov. 14, 1969, Ser. No. 876,859
Int. Cl. B29c 1/02, 17/04, 7/00
U.S. Cl. 264—92           10 Claims

ABSTRACT OF THE DISCLOSURE

A thin mold is formed from a pattern out of a thin sheet of thermoplastic synthetic resin, preferably a thermoplastic elastomer. Since this mold is too thin to be used for casting, it is backed with a cast material so that the mold comprises a thin sheet of elastomer and a removable cast backing. After the article is cast in this mold, the backing is removed. This enables the thin mold to be readily and expeditiously removed from the cast article without either damaging the article or the mold.

BACKGROUND OF THE INVENTION

My invention relates to a method for making and using a mold. In the prior art, where it was desired to mold relatively complicated patterns such as simulated wood panels and the like from synthetic resins, the mold was formed from relatively expensive resilient material. This permitted the mold to be deformed in order to enable it to be removed from the finished article. One such material from which molds had been formed in the prior art is silicone rubber. The making of such molds involves great care and thoroughness. First the correct amount of a selected catalyst must be mixed with the uncured base in precisely the correct proportions. Secondly the catalyst and the base must be mixed thoroughly. Immediately after blending, the mixture must be pressurized because otherwise the mixture will froth. Alternatively, the mixture may be placed in a vacuum chamber. The mold thus made would cure within twenty-four hours at room temperature and be ultimately cured to its properties ready for use within seventy-two hours. It will be observed that the silicone rubber molds of the prior art possess several distinct disadvantages:
  (a) The molds are expensive.
  (b) The molding materials require careful preparation.
  (c) It requires about three days to make a mold and place it in condition for use.

SUMMARY OF THE INVENTION

One object of my invention is to provide a molding method which has all the advantages of a silicone rubber mold but which can be made in as little as one-half hour.
Another object of my invention is to provide a method of making a mold having such thin walls that it may be rapidly separated from the cast article.
Another object of my invention is to provide a method for making a mold which can be easily and rapidly duplicated if damaged.
A further object of my invention is to provide a molding method in which a release agent can be dispensed with and yet permit easy separation of the cast article from the mold.
Other and further objects of my invention will appear in the following description.

In general, my invention contemplates making a pattern of the article to be cast from any suitable material, such as wood, metal, plaster, glass, ceramic material, or the like. The pattern is then provided with a plurality of bores or small holes passing therethrough providing communication between the top of the pattern and its bottom. A thin sheet of a thermoplastic synthetic resin, such as a high modulus styrene-butadiene copolymer, polyethylene, vinyl homopolymers, cellulose acetate, cellulose acetate butyrate, cellulose propionate ethyl cellulose, acrylic resins or modified acrylic compounds or the like, is then placed over the pattern. I prefer to use a thermoplastic elastomer. The thickness of the sheet is not critical except that it must be thin enough to be readily flexed to expedite its removal from the casting and thin enough to be readily deformed to comply with the pattern under the influence of less than fifteen pounds per square inch pressure while in plastic state under the influence of heat. I have found that a sheet in the thickness in the order of about 3/16 inch is suitable.

The thin sheet is then heated in any appropriate manner to render it plastic. A radiant heater may be employed if desired. Alternatively, the thin sheet may be heated to render it plastic before it is placed over the pattern. In the case of a high modulus styrene-butadiene copolymer, the sheet may be heated to a temperature between about 300° F. and 400° F. The sheet is then vacuum formed so that the atmospheric pressure will make the plastic sheet comply with the configuration of the pattern. If desired, a superatmospheric pressure may be imposed over the sheet instead of using a vacuum to produce the desired pressure differential.

Thereafter, the pattern and the sheet, which now form a mold, are placed in a box following which any appropriate molding material is poured over the pattern in the box. Plaster of Paris, synthetic resin, as for example, methylmethacrylate resins, urethane resins, polyester resins, or the like are suitable casting materials. After pouring, they are allowed to set. This forms a nest or backing for the thin mold. The mold and its backing are then removed from the pattern and the mold is ready for use when placed in a box or case. The desired molding material is then poured into the mold. Articles may be cast of plaster, epoxy resin, polyester resin, silicon rubber, low melting point metals or urethane foam or the like. After the casting material has been set, the backing is removed from the mold following which the mold may be readily removed from the cast article.

BRIEF DESCRIPTION OF THE DRAWINGS

In the accompanying drawings which form a part of the instant specification and which are to be read in conjunction therewith and in which like reference numerals are used to indicate like parts in the various views:

FIG. 1 is a perspective view of an ornamental panel which is to be reproduced by my process.

FIG. 2 is a cross sectional view of a pattern corresponding to a section taken along line 2—2 of FIG. 1.

FIG. 3 is a sectional view showing the pattern placed in a vacuum box provided with a radiant heater assembly for heating the thermoplastic mold forming material.

FIG. 4 is a sectional view showing the mold and its pattern removed from the vacuum former and placed in a mold box.

FIG. 5 is a sectional view showing the arrangement of parts after the mold backing has been formed over the mold.

FIG. 6 is a sectional view showing the mold and its backing removed from the mold box.

FIG. 7 is a sectional view showing the mold and its backing in the mold box with the casting material poured over the mold.

FIG. 8 shows a sectional view showing the mold backing, the mold and the cast article removed from the mold box.

FIG. 9 is a view showing the parts with the mold backing removed from the mold.

FIG. 10 shows the cast article with the mold removed therefrom.

More particularly, referring now to the drawings, a pattern 10 of the article 8 as shown in FIG. 1 is made in any suitable method known to the art. The pattern may be carved of wood or may be formed of plastic, wax, metal, glass, clay, or synthetic resins or the like. Owing to the fact that my method reproduces the slightest imperfection, care should be taken to insure that the surface of the pattern is completely clear and free of chips, shavings, or particles of foreign matter. The pattern 10 is provided with apertures 12 passing therethrough to facilitate vacuum forming and then placed in a vacuum former indicated generally by the reference numeral 14 in FIG. 3. This former is provided with a vacuum chamber 15 communicating with a vacuum pump 16. A thin sheet 18 of a suitable thermoplastic elastomer which is especially adapted for vacuum forming is then placed over the pattern. I prefer to use a high modulus thermoplastic copolymer of styrene and butadiene. I have found that this material combines the characteristic elasticity and flexibility of vulcanized elastomers and lends itself readily to the simplicity of thermoplastic-forming techniques. Furthermore, no vulcanization is required. The sheet of material advantageously has a thickness of about 3/16 inch. The sheet of material which is to form the mold may be preheated before it is placed over the pattern to a temperature between 300° F. and 400° F., preferably around 375° F. Advantageously it may be heated in situ by a radiant heater 20 shown in FIG. 3, which comprises a housing 22 provided with radiant heating elements 24. Openings 26 are provided to permit atmospheric pressure to deform the molding sheet 18 upon the creation of reduced pressure in the chamber 15 so that the mold material 18 may comply with the pattern.

Other types of resins which may be used in my process include ethylenically unsaturated monomers, as for example, vinyl chloride, acrylonitrile and acrylates such as for instance methylmethacrylate. Where there are undercut portions in the pattern, the styrene butadiene elastomers are much the preferable material. When the surfaces of the pattern are straight or the mold walls are tapered outwardly, sheets of any of the following synthetic resins may be employed: polyethylene; rigid or partly plasticized vinyl homopolymers; polystyrene homopolymers or copolymers with acrylonitrile or methylmethacrylate; terpolymers of or physical blends of acrylonitrile, butadiene and styrene polymers; rigid or plasticized cellulose derivatives such as cellulose acetate, cellulose acetate butyrate, cellulose propionate or ethyl cellulose; acrylic or modified acrylic compound and polycarbonate. It is understood, of course, that before the vacuum forming takes place that the sheet is heated to a plastic state.

While vacuum molding is a simple technique, it is limited to the superimposition of fifteen pounds per square inch pressure, and this is adequate to obtain a good conformation between the pattern and the mold with thin sheet of mold forming material.

If desired, superatmospheric pressure can be applied above the heated mold instead of relying on the pressure differential between a partial vacuum and atmospheric pressure. This is preferred when thicker sheets of mold forming material are desired. Generally I do not employ a mold thicker than one-half inch.

After the thin mold 18 has been formed, the flash is trimmed and it and the pattern 10 are placed in a case 30 as seen in FIG. 4. A backing composition 32, which may be any castable material such as plaster of Paris, a low melting point metallic alloy, clay, polyester resins, silicone rubber, urethane foam, methylmethacrylate resin or the like, is then poured over the assembly and held in place by cover 34 under suitable pressure as shown in FIG. 5. The casting material 32 is allowed to harden. Preferably I use a polyurethane foam having a density of between twenty pounds and thirty pounds per cubic foot in the making of simulated wood panels. This foam is an excellent backing composition. The foam will cure itself in about fifteen minutes. The curing reaction is exothermic and the temperature levels off at about 150° F. The ambient temperature and the temperature of the mold have an effect on the curing time. Since my mold does not dissipate heat rapidly, the curing time is shorter than would be the case with a metal mold which conducts heat easily. Owing to the fact that my mold has insulating tendencies, a more uniform gradient in density of the casting is achieved. If the pattern is such that a large pour is required, the heat of the reaction will not be so readily dissipated. This occurs because of the foam's thermal insulating properties.

After the backing has been hardened, the mold and its backing are removed from the case 30 and the pattern separated from the mold. A cross section of the mold 18 and its backing 32 are shown in FIG. 6. The mold and its backing are then placed in a mold box 40 and a suitable casting material 42 is poured over the mold. Preferably I use polyurethane foam, using the same steps described above in respect of making the backing. That is, I employ a urethane foam having a density of between twenty and thirty pounds, pour it over the mold and the mold box 40, clamp a cover 42 over the mold box with clamps 44 and permit the foam to expand and set. This occurs in about fifteen minutes, the clamps being such that they will sustain a pressure of at least thirty pounds per square inch. If the pattern is thin so that the exothermic heat is small owing to the small mass of foam, a longer curing time may be allowed. In general, elevated temperatures accelerate curing, while lower temperatures require longer times. After the part has been cast, the assembly comprising the mold backing 32, the mold 18 and the casting 42 are removed from the mold box 40. If desired, a release agent such as a silicone spray may be sprayed over the mold before the casting step. Such release agent is not necessary in most cases owing to the elasticity of the mold. If, however, an epoxy casting is being made, that is, the casting material is an epoxy resin, then a release agent is necessary to prevent the epoxy from adhering to the mold. The assembly shown in FIG. 8 comprising the mold backing, the mold and the casting is then inverted and the mold backing removed from the mold 18. This permits the thin mold to be readily removed from the casting 42 as shown in FIG. 10. The thin mold permits ready and rapid release from the casting. If the mold is damaged, it can be easily duplicated. If desired, fillers such as shredded fibrous material, titanium dioxide, powdered lead, powdered aluminum, or the like may be mixed with the urethane foams.

Urethane foams are well known to the art and comprise a viscous prepolymer and a catalyst component. These components are supplied in separate containers by the manufacturer and are mixed as is known in the art to form the casting material. Since these form no part of my invention, they are not described.

It will be seen that I have accomplished the objects of my invention. I have provided a novel method of molding using an improved mold which can be prepared in less than a half hour. The thin mold allows ready and rapid release of the cast article from the mold. As the mold is easily duplicated if damaged and a release agent can be dispensed with in most cases, my molding method enables the production of cast articles in a simple, convenient, rapid, and inexpensive manner.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of casting relatively shallow articles including the steps of forming a pattern of the desired article, placing a thin sheet of thermoplastic synthetic resin over said pattern, conforming said sheet with said pattern with one side of the sheet contacting said pattern over the surface thereof, casting a backing which is non-adherent with said sheet onto the other side of said sheet while on said pattern to form a composite mold comprising said sheet and said backing, removing said composite mold as a unit from said pattern, pouring a casting material which is non-adherent with said sheet into the composite mold thus formed over said one side of said sheet, allowing the casting to cool to form the desired article, removing said mold backing from the assembly of said thin sheet and cast article and then removing the thin sheet from the cast article.

2. A method as in claim 1 in which said conforming step includes first heating said sheet of thermoplastic resin and then subjecting the heated sheet to differential pressure.

3. A method as in claim 1 in which said conforming step includes first heating said sheet of thermoplastic synthetic resin and then vacuum-forming it.

4. A method as in claim 1 in which said thin sheet of synthetic resin is an elastomer.

5. A method as in claim 1 in which said thin sheet of synthetic resin has a thickness of about $3/16$ inch.

6. A method of casting relatively shallow articles including the steps of forming a pattern of the desired particle, placing a thin sheet of thermoplastic synthetic resin over said pattern, conforming said sheet with said pattern with one side of the sheet contacting said pattern over the surface thereof, applying a release agent to said sheet, casting a backing onto the other side of said sheet while on said pattern to form a composite mold comprising said sheet and said backing, removing said composite mold as a unit from said pattern, applying a release agent to said mold, pouring a casting material into the composite mold thus formed over said one side of said sheet, allowing the casting to cool to form the desired article, removing said mold backing from the assembly of said thin sheet and cast article and then removing the thin sheet from the cast article.

7. A method as in claim 6 in which said conforming step includes first heating said sheet of thermoplatic resin and then subjecting the heated sheet to differential pressure.

8. A method as in claim 6 in which said conforming step includes first heating said sheet of thermoplastic synthetic resin and then vacuum-forming it.

9. A method as in claim 6 in which said thin sheet of synthetic resin is an elastomer.

10. A method as in claim 6 in which said thin sheet of synthetic resin has a thickness of about $3/16$ inch.

References Cited

UNITED STATES PATENTS

| | | | |
|---|---|---|---|
| 3,065,511 | 11/1962 | Leitzel | 264—225 X |
| 3,219,307 | 11/1965 | Leeds et al. | 264—220 X |
| 2,271,454 | 1/1942 | Erdle et al. | 264—227 |

FOREIGN PATENTS

| | | | |
|---|---|---|---|
| 1,146,372 | 11/1957 | France | 264—225 |

ROBERT F. WHITE, Primary Examiner

J. H. SILBAUGH, Primary Examiner

U.S. Cl. X.R.

264—93, 220, 264, 334; 249—112; 425—112, 388

PO-1050
(5/69)

UNITED STATES PATENT OFFICE
CERTIFICATE OF CORRECTION

Patent No. 3,703,572      Dated November 21, 1972

Inventor(s) GERALD J. BELLASALMA

It is certified that error appears in the above-identified patent and that said Letters Patent are hereby corrected as shown below:

Column 5, line 31:
    "particle"     Should read: -- article --

Signed and sealed this 1st day of May 1973.

(SEAL)
Attest:

EDWARD M. FLETCHER, JR.     ROBERT GOTTSCHALK
Attesting Officer            Commissioner of Patents